United States Patent [19]

Flament

[11] Patent Number: 5,133,518
[45] Date of Patent: Jul. 28, 1992

[54] ATTITUDE CONTROL DEVICE USING SOLAR SAILS FOR A SATELLITE STABILIZED ON THREE AXES

[75] Inventor: Patrick Flament, Le Cannet, France

[73] Assignee: Societe Nationale Industrielle et Aerospatiale, Paris, France

[21] Appl. No.: 632,455

[22] Filed: Dec. 21, 1990

[30] Foreign Application Priority Data

Dec. 29, 1989 [FR] France ................................. 89 17479

[51] Int. Cl.$^5$ ............................................. B64G 1/44
[52] U.S. Cl. .................................. 244/173; 244/168; 136/244
[58] Field of Search ....................... 244/164, 168, 173; 136/244, 245, 292

[56] References Cited

U.S. PATENT DOCUMENTS

| | | | |
|---|---|---|---|
| 3,304,028 | 2/1967 | Nicklas et al. .................... | 244/168 |
| 3,339,863 | 9/1967 | Nicklas et al. . | |
| 4,262,867 | 4/1981 | Piening .............................. | 244/168 |
| 4,426,052 | 1/1984 | Hubert et al. ..................... | 244/168 |
| 4,988,060 | 1/1991 | Janson et al. ..................... | 244/173 |

FOREIGN PATENT DOCUMENTS

| | | |
|---|---|---|
| 2537577 | 3/1977 | Fed. Rep. of Germany . |
| 2530046 | 1/1984 | France . |
| 0186498 | 7/1989 | Japan ................................ 244/168 |
| 9006259 | 6/1990 | PCT Int'l Appl. .............. 244/168 |

*Primary Examiner*—Joseph F. Peters, Jr.
*Assistant Examiner*—Carla Mattix
*Attorney, Agent, or Firm*—Browdy and Neimark

[57] ABSTRACT

An attitude control device for a satellite stabilized on three axes including a pitch axis comprises two solar generator wings extending in opposite directions away from a satellite body on respective longitudinal axes at least approximately parallel to the pitch axis. Two drive motors drive these wings independently of each other in rotation about rotation axes at least approximately parallel to the pitch axis to keep the wings facing the Sun with a depointing angle at most equal to a predetermined maximum depointing value. Sensors measure attitude angles and a computation system commands the drive motors according to the attitude angles. On each wing an additional surface in the form at least one vane extends longitudinally beyond the end of the wing parallel to its longitudinal axis. These additional surfaces have substantially the same surface area and are inclined about this axis relative to the wings in opposite directions by at least approximately the same angle which is less than the 90° complement of the maximum amplitude of wing depointing.

11 Claims, 9 Drawing Sheets

ATTITUDE CONTROL DEVICE USING SOLAR SAILS FOR A SATELLITE STABILIZED ON THREE AXES

BACKGROUND OF THE INVENTION

1. Field of the Invention

The invention concerns a device for roll and yaw attitude control of a satellite, usually a geostationary satellite, stabilized on its three axes, possibly including compensation of disturbing torque acting on the satellite about said three axes.

In this context a satellite is any artificial object in the solar system:
  orbiting the Earth or any other planet in the solar system, or
  orbiting a satellite of any planet in the solar system, or
  in solar orbit, possibly a transfer orbit between two planets.

2. Description of the Prior Art

The attitude of an orbiting satellite is affected by disturbing torques, the major causes of which are:
  the asymmetry of the solar radiation pressure due to the angle of the pitch axis (Y) of the satellite relative to the Sun (difference with respect to 90°), to the differing reflectivity of different parts of the satellite and to any geometrical asymmetry of the satellite,
  the local (for example, terrestrial) magnetic field,
  the local (for example, terrestrial) gravity gradient (in low orbits),
  the aerodynamics of the environment (in low orbits).

Consequently, a system for controlling the attitude of a satellite in its orbit is essential. Known active systems for this purpose respectively use multiple reaction wheels or thrusters, but:
  the use of thrusters to impart brief attitude correction pulses from time to time causes excitations which affect the structure, the solar panels and the sensitive part of the satellite; also, the propellants used for attitude control increase the mass of the satellite;
  the use of reaction wheels also increases the overall mass of the satellite.

To control the attitude of a satellite with minimum disturbance and with an optimized mass budget, use is made of disturbing forces due:
  to the solar radiation pressure (by appropriately orienting surfaces attached to the satellite), or
  to the local (for example, terrestrial) magnetic field, by creating magnetic dipoles on board the satellite using current loops.

Various documents have already proposed the use of solar pressure for satellite attitude control or stationkeeping, using surfaces adapted to be oriented by dedicated actuators.

Representative prior art includes:
French patent FR-2.513.589: PROCEDE ET DISPOSITIF POUR ALIGNER L'AXE DE ROULIS D'UN SATELLITE AVEC UNE DIRECTION DESIREE,
German patent DE-2.537.577: LAGERREGELUNG FüR SATELLITEN,
French patent FR-2.550.757: REGULATION DE POSITION DE SATELLITES,
American patent US-3.304.028: ATTITUDE CONTROL FOR SPACECRAFT,
French patent FR-2.529.166: PROCEDE DE MAINTIEN EN POSITION D'UN SATELLITE PAR LA NAVIGATION A L'AIDE DE VOILE SOLAIRE ET VEHICULE SPATIAL METTANT EN OEUVRE LE PROCEDE.

These solutions increase the mass and reduce the reliability of the satellite.

A simpler way to control the attitude of a satellite stabilized on three axes is to orient appropriately the surfaces of the solar generator wings (which are generally elongated structures parallel to the pitch axis), using their respective drive motors, to create torques about two perpendicular axes in a plane (plane of the trajectory) perpendicular to the pitch axis Y: the projected solar axis S and the perpendicular transverse axis P, the three axes Y, S and P defining a direct trihedron.

This principle is described in particular in the documents:
ATTITUDE CONTROL BY SOLAR SAILING—A PROMISING EXPERIMENT ON OTS 2 by Udo RENNER—ESA JOURNAL 1979, Vol 3.
ONE YEAR OF SOLAR SAILING WITH OTS—ESA BULLETIN 31 - August 1982.
Patent FR-2.531.547: SYSTEME DE CONTROLE D'ATTITUDE D'UN SATELLITE GEOSTATIONNAIRE.
U.S. Pat. No. 4,325,124: SYSTEM FOR CONTROLLING THE DIRECTION OF THE MOMENTUM VECTOR OF A GEOSYNCHRONOUS SATELLITE.

in a different context, the American U.S. Pat. No. 3,945,148: SATELLITE ROTATION BY RADIATION PRESSURE, which proposes the use of the solar pressure on the solar generator wings, which are appropriately oriented to rotate the satellite in order to stabilize it.

In the following description the term "solar generator" refers to the combination of both solar wings, the term "solar generator wing" designating the systems that can be oriented by the drive motors, namely:
  the photovoltaic elements of the solar generator,
  the structure supporting these elements,
  the mechanisms associated with this structure which:
  hold it in the stowed position until the satellite reaches its orbital configuration,
  deploy it and maintain it in the deployed configuration,
  all the additional elements which, in the orbital configuration, are fixed to the structure and which have various roles, including (for example):
  heatshields which are used to limit heat loss from the satellite during phases in which the solar generator is not fully deployed,
  surfaces which improve the luminous flux impinging on the photovoltaic elements (shadow uniformization screen, for example).

In some cases a satellite has deployable heatsinks which can also be used as surfaces exposed to the solar radiation.

The main advantage of this principle is its use of existing equipment on the satellite:
  the solar generator wings as the surfaces exposed to the solar radiation, and
  the solar generator drive motors, as the actuators.

It has disadvantages, however:
  no torque is generated about the pitch axis (Y) on which there is therefore no compensation of any disturbances,
  it is not possible to generate any torque about the transverse axis P without simultaneously generating a torque about the solar axis S, which rules out its use for automated control at all times of day and prevents the balancing out of some combinations of disturbing torques, significant torque about the P axis can only be generated at the cost of significant loss of power from the solar generator.

The French patent FR-2.530.046 PROCEDE ET DISPOSITIF DE COMMANDE D'ATTITUDE POUR SATELLITE GEOSYNCHRONE proposes an improvement to this principle by adding to the sides of the solar generator wings lateral vanes fixed symmetrically relative to the satellite-Sun axis passing through the centre of the satellite. This retains the use of the solar generator drive motors as actuators and makes it possible to obtain all combinations of torque about the S and P axes, with loss of power from the solar generator limited to acceptable values. The major disadvantage of this concept is that it systematically adds to the torque generated in the roll-yaw plane a disturbing torque about the pitch axis Y due to the offset between the centre of the lateral vane surfaces and the pitch axis Y. This Y-axis torque is subject to fluctuations which can be of large amplitude, with a direct correlation in direction and in amplitude to variations in the roll-yaw torque applied about the P axis, around a null mean value. This disturbing torque increases the consumption of propellant and/or the size of the wheels used for pitch control.

An object of the invention is to meet not only the objective of the document FR-2.530.046 with regard to attitude control in the roll-yaw plane, but further to enable as complete compensation as possible of external disturbance about the pitch axis, without significant increase in mass or reduction of reliability. It is therefore directed to reducing the amplitude of these fluctuations, while allowing a choice of the mean value of said fluctuations with a possibly non-null value adapted to compensate on average the external disturbances about the Y axis.

Another object of the invention is, for the same surface area of the additional vanes as in the patent FR-2.530.046 and for the same maximum amplitude of depointing relative to the Sun, to increase the torques that can be achieved about the P axis and so to widen the range of satellites adapted to be controlled in attitude using the solar radiation pressure, in particular to confer the advantages of the previously mentioned patent.

SUMMARY OF THE INVENTION

The present invention consists in an attitude control device for a satellite stabilized on three axes including a pitch axis, the device comprising two solar generator wings extending in opposite directions away from a satellite body on respective longitudinal axes at least approximately parallel to the pitch axis, two drive motors adapted to drive said wings independently of each other in rotation about rotation axes at least approximately parallel to the pitch axis to keep said wings facing the Sun with a depointing angle at most equal to a predetermined maximum depointing value, a set of sensors adapted to measure attitude angles and a computation system adapted to command the drive motors according to the attitude angles, which device further comprises on each wing an additional surface in the form at least one vane extending longitudinally beyond the end of said panel, parallel to its longitudinal axis, said additional surfaces having substantially the same surface area and being inclined about said axis relative to said wings in opposite directions at approximately the same angle less than the 90° complement of said maximum amplitude of wing depointing.

The longitudinal axes and the rotation axes of the wings are often parallel to, or even coincident with, the pitch axis, but in some satellites they may be offset transversely and/or angularly by a few degrees (for example, 1° to 3°).

The present invention adapts the idea of longitudinal vanes from the previously mentioned French patent No FR-2.513.589 PROCEDE ET DISPOSITIF POUR ALIGNER L'AXE DE ROULIS D'UN SATELLITE AVEC UNE DIRECTION DESIREE to the requirements of a satellite stabilized on three axes, i.e. to a totally different context.

When compared with the document FR-2.530.046, the present invention achieves comparable performance on the S axis, about 5% better performance on the P axis and continuous compensation of the mean torque about the pitch axis Y without introducing other minor disturbance about this axis.

Differing in this respect from the previously mentioned two documents, the novel feature of the invention is that the additional vanes are attached to the solar generator wings at a single point, rather than along the entire edge of the panel, an arrangement which those skilled in the art have tended to reject out of hand because of the apparently insurmountable difficulties of deploying such vanes from a stowed configuration in which they are parallel to the panels. The invention has overcome this received wisdom and proposes a solution to this problem that is technically simple and reliable. This represents an improvement of 5% or more in comparison with the document FR-2.530.046 vis-a-vis the torques that can be generated about the P axis for the same vane surface area and the same depointing angles.

According to preferred features of the invention, some of which may be combined with others:

the angle $\alpha$ is substantially equal, to within 5°, to the 90° complement of the maximum amplitude of wing depointing, said maximum amplitude of wing depointing has a value of approximately 10° and said amplitude of inclination of the vanes is approximately 80°, the additional surface associated with at least one panel is in the form of a single vane, said additional surfaces are offset overall to the same side of the pitch axis if the wings are coplanar, each additional surface is in the form of a single vane and said vanes are offset relative to said pitch axis by approximately equal distances, said offset distance is between 5% and 45% of the width of the wing, the additional surface associated with at least one wing comprises at least two separate parallel vanes coupled to said wing and offset transversely relative to the pitch axis, the additional surface associated with at least one wing comprises at least two vanes articulated to each other transversely to the pitch axis, each additional surface comprises at least one vane in the shape of a rectangle whose respective front and rear corners near the wing to which it is fixed are cut away starting from the area fixed to the wing and at approximately equal angles measured relative to an imaginary edge of said vane transverse to said longitudinal axis of the wing carrying said vane, said front and rear corners are cut away at an angle between 23° and 30°, each vane comprises a frame to which is adhesively bonded an unstretched skin adapted to absorb solar radiation, each additional surface is folded up with the respective solar generator wing in the stowed configuration of said wing.

Stowing the vane is facilitated, even if it has a large surface area, by dividing one of the additional surfaces into a plurality of vanes that are articulated accordeon-fashion.

The mean value of the Y-axis torque depends on the offset relative to the pitch axis of the additional surfaces (taken as a whole if at least one vane is in several sections: the reasoning can be based on a "centre of surface" defined by the bary centre of the zones where the various sections are attached while associating to these zones of these sections).

Objects, characteristics and advantages of the invention will emerge from the following description given by way of non-limiting example only with reference to the appended diagrammatic drawings.

DETAILED DESCRIPTION OF THE INVENTION

Figures 1, 1A:
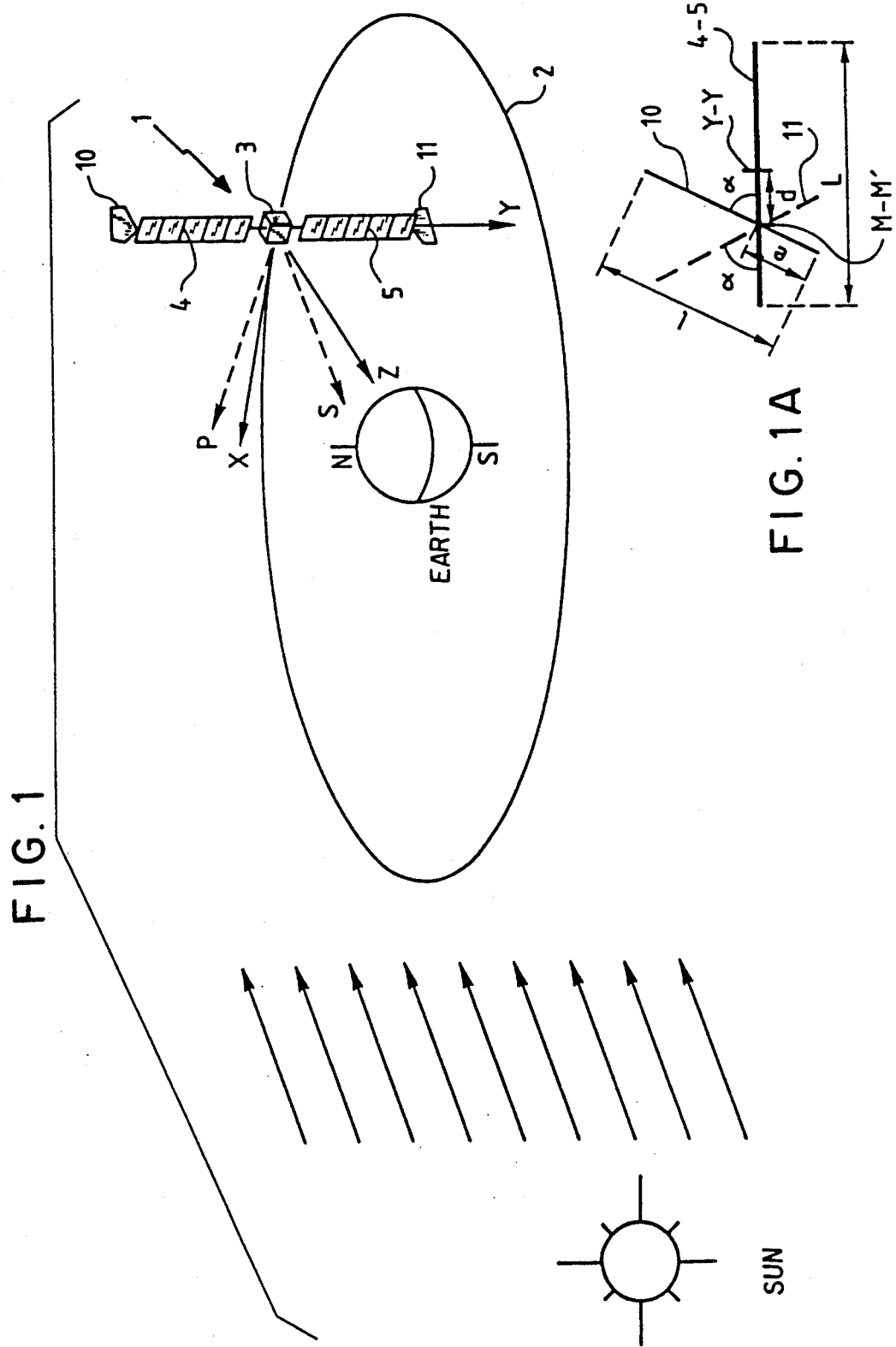
FIG. 1 is a schematic view of a spacecraft stabilized on three axes in orbit around the Earth.
FIG. 1A is a diagram showing, as seen from the North, the positions and inclinations of the additional vanes relative to the plane of the solar generator wings.

FIG. 1 shows a satellite 1 in a circular Earth orbit 2.

The satellite has a central body 3. Three axes define a direct frame of reference fixed relative to the satellite:

an axis X tangential to the orbit 2 and in the same direction as the orbital speed: this axis is conventionally called the roll axis;

an axis Y perpendicular to the plane of the orbit 2 and oriented in the terrestrial North-South direction: this axis is conventionally called the pitch axis; and an axis Z perpendicular to the axes X and Y and oriented towards the Earth: this axis is conventionally called the yaw axis.

In some satellites this roll-pitch-yaw axis system may be oriented differently relative to the orbit and/or the Earth, depending on specific mission requirements. The invention is equally applicable in these cases, even if the orientation of the satellite varies during the mission.

The satellite includes an attitude control system (see below) which stabilises it in the orbit 2 with respect to these three axes.

Figure 3:
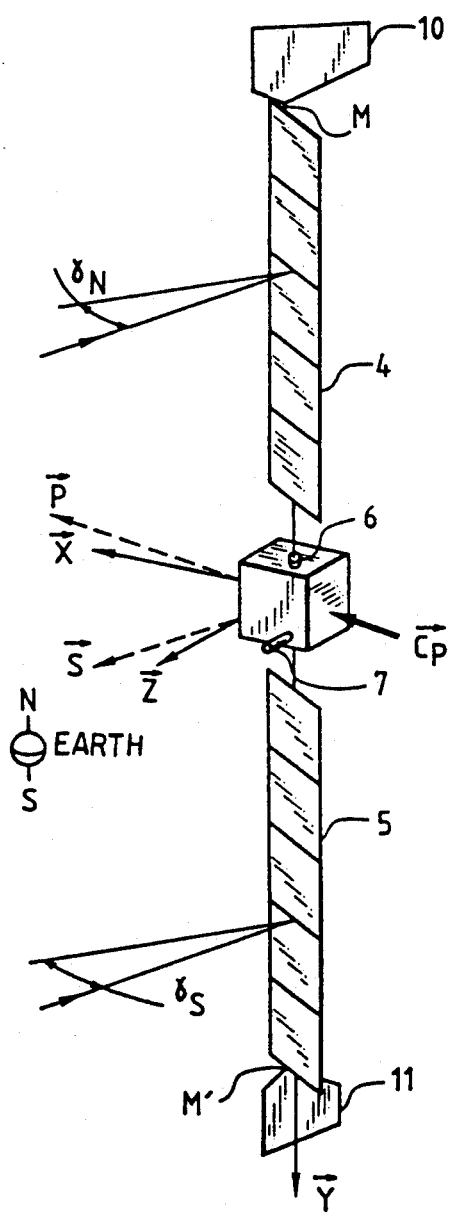
FIG. 3 is a schematic perspective view of the satellite in another configuration in which the solar radiation pressure generates an unbalance torque.
Figure 2:
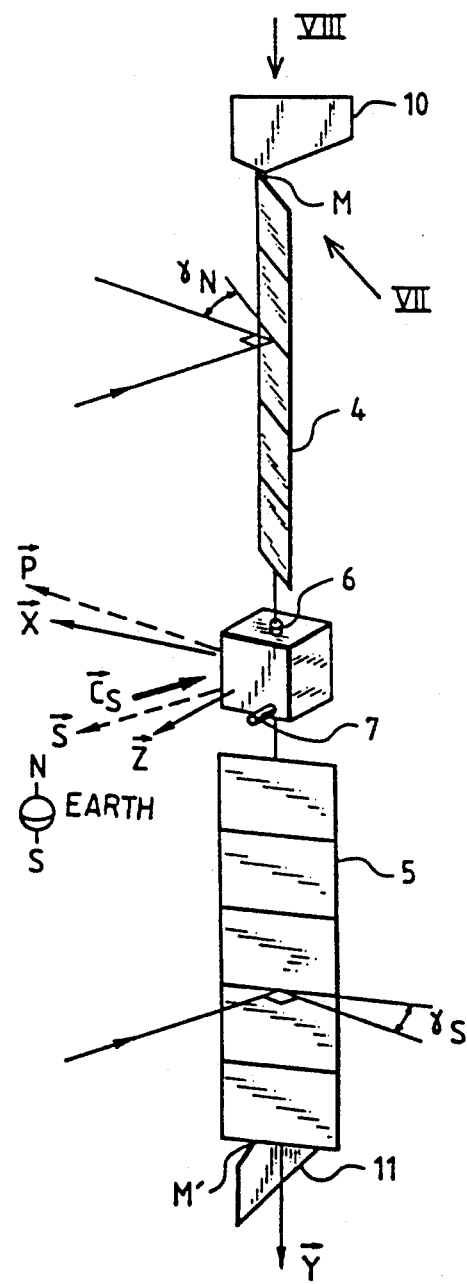
FIG. 2 is a schematic perspective view of the satellite in a configuration in which the solar radiation pressure generates a windmill torque.

It further includes (see also FIGS. 2 and 3) a solar generator comprising two wings 4 and 5 respectively extending to the North and to the South along longitudinal axes coincident with the Y axis. They can be oriented relative to the body 3 by rotation about axes also coincident with the Y axis by two separately controllable drive motors of any appropriate known type, one of which, on the North side of the body 3, is denoted by the reference number 6: these motors are normally adapted to hold the wings facing substantially towards the Sun, perpendicular to its rays.

In practice the satellite further comprises various appendages (antennas, etc) which are fixed or effectively fixed and whose exposure to the solar radiation pressure produces disturbing torques about the X and Z axes which are added to those resulting from any intentional or unintentional asymmetry of the solar generator. For example, telecommunication satellites usually carry one or more transmission antennas: the radiation pressure of the transmission beam produces a disturbing torque about Y that the invention is directed to compensating on average.

An axis S in the X-Z orbital plane is the projection in this plane of a vector oriented from the satellite to the Sun. An axis P in the X-Z orbital plane and perpendicular to the axis S defines with the Y and S axes a direct frame of reference (P, Y, S).

Note that the satellite-based frame of reference (X, Y, Z) rotates relative to the inertial frame of reference (P, Y, S) about the Y axis at the rate of one revolution per orbit (one revolution per day in the case of a geostationary orbit).

The satellite further includes a set of sensors adapted to measure the attitude of the satellite, usually at least one terrestrial sensor 7 (an infrared sensor, for example) adapted to measure the attitude in roll and in pitch and Sun or star detectors for measuring in particular the attitude in yaw, if required.

The remaining description is concerned only with controlling the attitude of the satellite about the roll and yaw axes, pitch attitude control being achieved by any appropriate known means (not shown), for example by variation of the kinetic moment. The satellite may also include a nutation damping device which will not be described in more detail as it does not form part of the invention.

The invention exploits the fact that the solar radiation pressure (solar pressure, for short) can, depending on the orientation of the two solar wings, generate two types of torque in the orbital plane, respectively about the S and P axes (in the remainder of the description the depointing of the North wing and the depointing of the South wing relative to their nominal orientation facing the Sun are respectively denoted $\gamma_N$ and $\gamma_S$).

The solar generator wings are provided with additional surfaces (solar sails) which in this example are in the form of additional longitudinal vanes 10 and 11 (see FIG. 1) for generating an unbalance torque (about the P axis), a windmill torque (about the S axis) and a pitch torque (about the Y axis).

As shown in more detail in FIG. 1A, the additional vanes are parallel to the longitudinal axis of the associated wing in this case the Y axis; relative to the planes (which in this instance are coincident) of the wings 4 and 5 to which they are joined, the vanes are inclined about the Y axis at substantially the same angle $\alpha$ (allowing for manufacturing tolerances) but in opposite directions.

Y—Y designates the longitudinal axes of the wings (in this instance coincident with the Y axis). The vanes are preferably attached to the wings at points M and M' which are offset to the same side of the Y—Y axis, advantageously at equal distances d. These distances (here equal) are in equal ratio r to the transverse dimension L of the panels.

The vanes have at least approximately the same surface area and in particular equal dimensions l in the direction transverse to the Y—Y axis. The vanes project beyond the plane of the corresponding wing towards the solar radiation (downwards in FIG. 1A) by preferably equal amounts e; this distance can be different than half their total dimension.

Consequently, in the example illustrated by FIG. 1A, when the wings are coplanar the projections of the vanes in the roll-yaw plane (perpendicular to the Y axis) are symmetrical relative to a plane containing the points M and M' and perpendicular to the plane of the wings.

The solar pressure acting on the solar generator wings generates a so-called "windmill" torque $C_S$ (see FIG. 2) if the depointing angles of the wings are the same but in opposite directions relative to their nominal position facing the Sun ($\gamma_S = -\gamma_N$). This torque is oriented along the solar direction (to be more precise, along the "projected" solar axis S).

As the longitudinal vanes are symmetrically oriented relative to the longitudinal transverse plane of the wings, if the two wings are offset angularly in opposite directions the additional vanes 10 and 11 present the same projected surface area to the Sun.

The difference in the solar pressure acting on the projected surfaces areas of the solar generator wings because of the inclination of the Sun relative to the plane of the orbit, and therefore relative to the S axis, results in second order torques if the depointing angles are small (below approximately 10° in this example). The arrangement of the additional vanes is such that the pressure due to the part of the solar radiation reflected by the vanes generates a windmill torque, which in practise has to be minimized. For this reason it is beneficial if the surface of the additional vanes is a poor reflector.

To prevent the pressure due to re-radiation from the additional vanes generating a windmill torque, it is advantageous for the emissivity of the two sides to be at least approximately equal.

The solar pressure acting on the additional vanes generates a so-called "unbalance" torque $C_p$ (see FIG. 3) if the wings have the same depointing angle in the same direction relative to their nominal position facing the Sun ($\gamma_S = \gamma_N$). This torque is due to the different projected surface areas of the additional vanes that face towards the Sun in this case. For this torque to be as large as possible:

the difference in their projected surface areas facing towards the Sun must be as large as possible, which means that the planes of the additional vanes 10 and 11 must be close to perpendicular to the solar generator wings 4 and 5 ($\alpha$ approaching 90°), the surface of the additional vanes presented to the Sun must be strongly absorbent, their orientation must prevent illumination of their rear surface, which means that the angle between the additional vanes and the normal to the solar generator wings (90° $-\alpha$) must be greater than the maximum depointing angle for the wings (so that this angle is at most 80° for a maximum depointing angle of 10°, ignoring manufacturing tolerances).

This torque is perpendicular to the solar direction (i.e. on the P axis). Because of their disposition, the solar generator wings present the same (or virtually the same) surface area to the Sun and so produce no torque.

Finally, the solar pressure acting on the additional vanes generate a permanent (or virtually permanent) torque $C_Y$ about the pitch axis Y because of the offset d of the "centre of surface" of the additional vanes relative to the satellite pitch axis Y. This offset, which is an adjustment parameter of the inventive device, must be defined before launch, as part of the design process for the solar generator and additional vanes system, on the basis of the results of dimensioning studies on the disturbing torques acting on the satellite, in order to minimize their effect (it must be remembered that the disturbing torques about the Y axis vary little and are always in the same direction).

Although modified by the depointing of the wings for the purpose of roll-yaw control, this torque is able to compensate on average the part known on the ground of the disturbing torque about the pitch axis Y and so enables the quantity of propellants or the weight of the actuators used for pitch control to be reduced.

It is possible to obtain the simultaneous combination of these three effects (about the P, S and Y axes) by algebraically summing the angular offsets needed for the torques about the S and P axes, these offsets having little influence on the permanent torque obtained about the pitch axis Y, as already mentioned.

Figure 4:
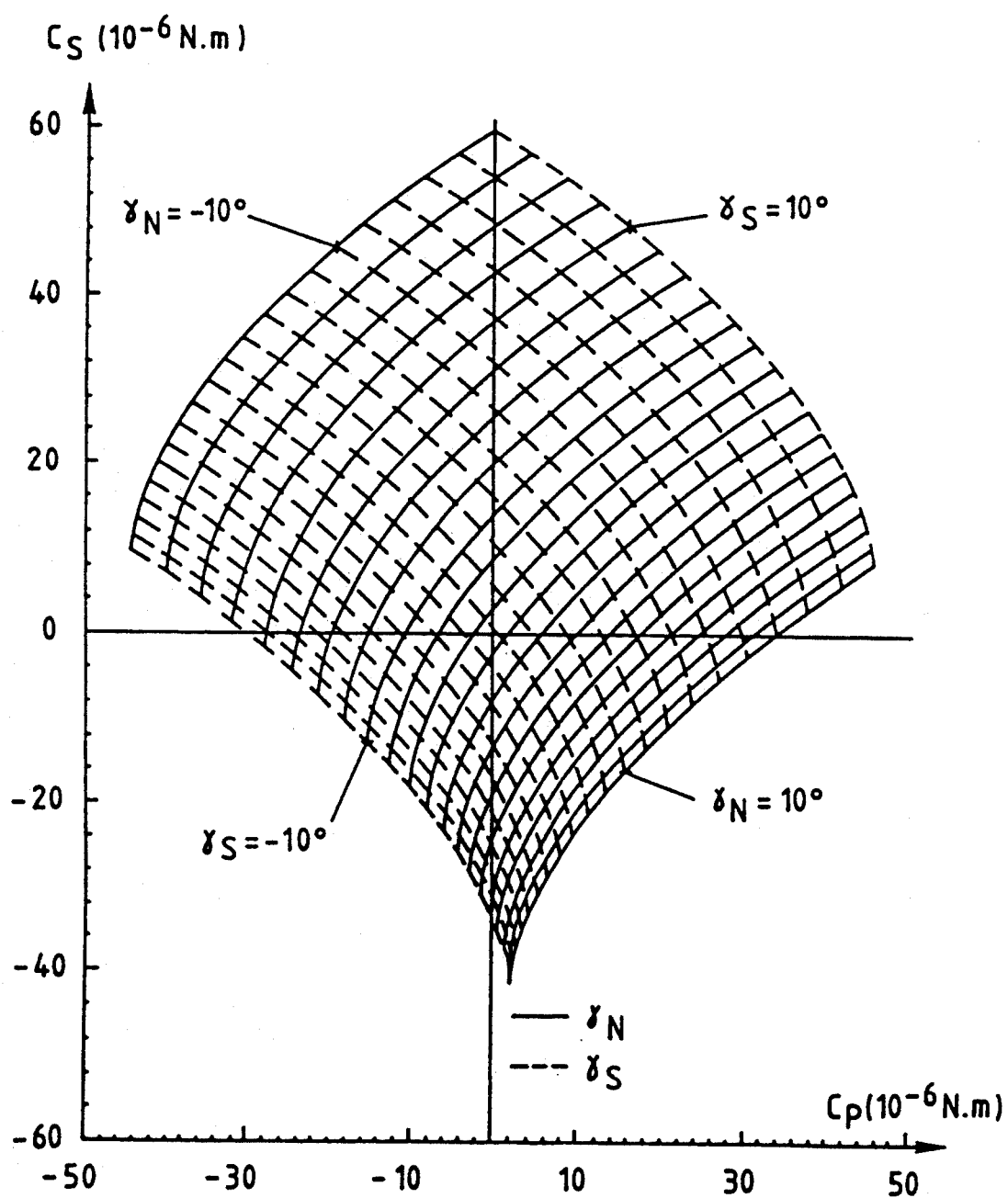
FIG. 4 is a graph showing the torques $C_p$ and $C_s$ that can be generated by the solar radiation pressure for various angles of inclination of the North and South wings.

FIG. 4 shows the S and P axis torque capacity of a EUTELSAT 2 type satellite modified in accordance with the invention for a maximum depointing angle of the wings of 10°. It can be seen that all possible combinations can be achieved.

As might be expected given the preceding remarks, the parametered surface which quantifies this torque capacity is approximately symmetrical relative to the $C_p=0$ axis and strongly asymmetrical relative to the $C_S=0$ axis. In particular, for depointing in opposite directions (see FIG. 2), $C_S$ is larger if the additional vanes are oriented towards the Sun than in the opposite case, whereas for equal depointing angles (see FIG. 3)

the torque $C_p$ is of substantially the same amplitude if the sign of the depointing angles is reversed.

Figure 5A:
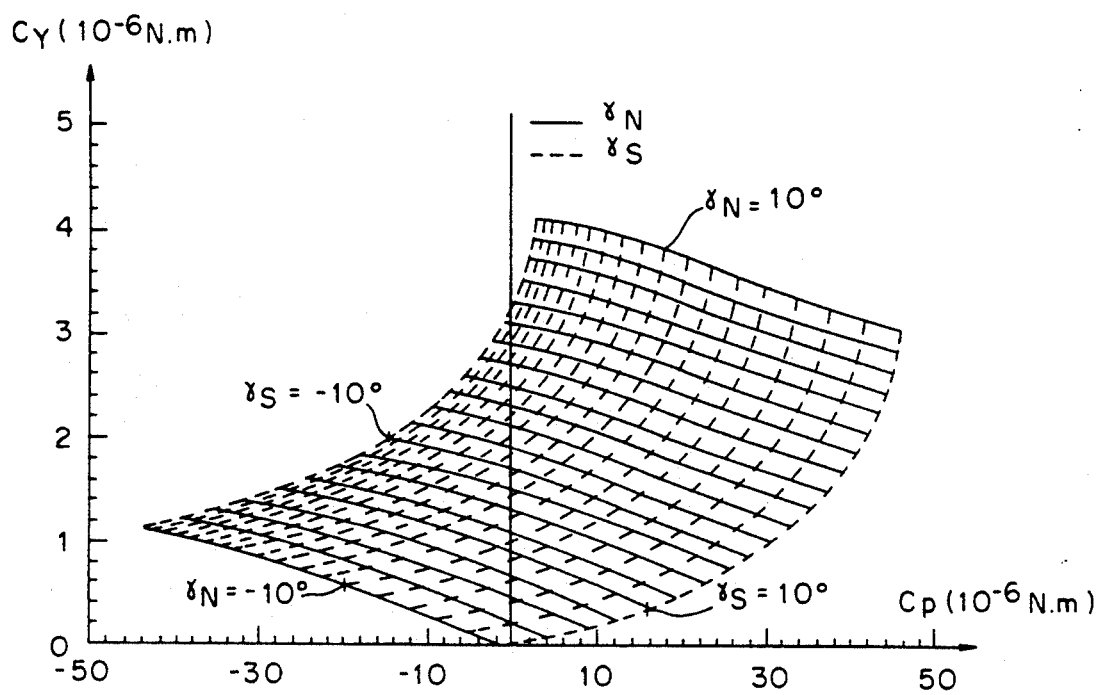
FIGS. 5A and 5B are graphs showing the correlation between the corresponding torque about the Y axis and one or other of the torques $C_p$ and $C_s$ as a function of the wing inclination angles.
Figure 5B:
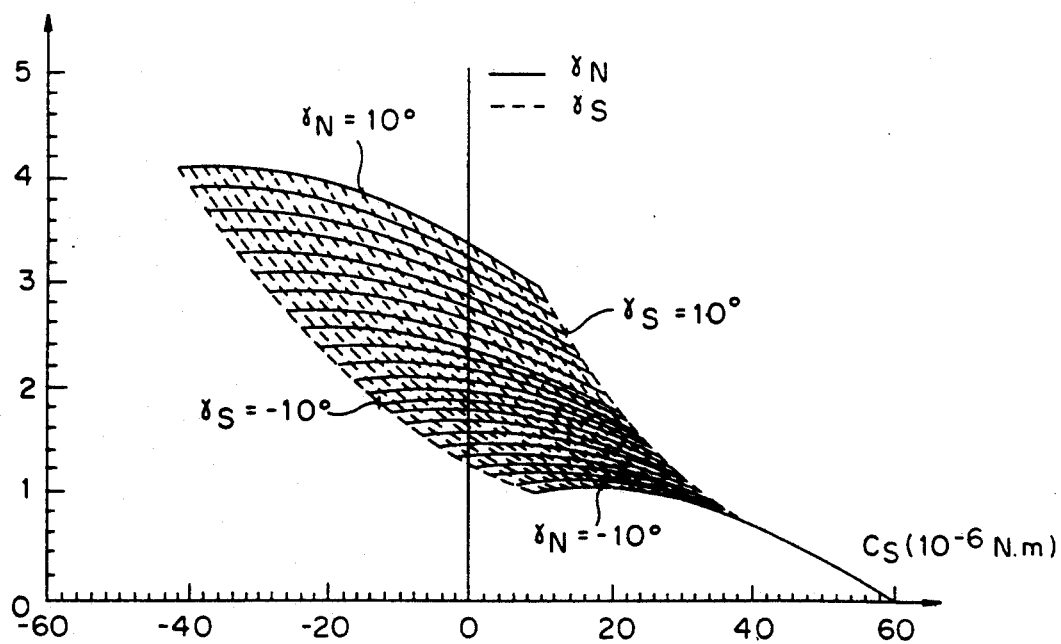

FIGS. 5A and 5B show the evolution of the torque $C_Y$ about the Y axis as a function of the torques about the P and S axes, respectively with the same hypotheses as FIG. 4. The compensating torque $C_Y$ about the Y axis is modified by the torques about the S and P axes without changing its sign, so that its mean value can be used as a secondary actuator of the pitch channel, as already mentioned.

In more precise terms, the torque $C_Y$ varies between 1 and $4.10^{-6}$ Nm when the torques $C_p$ and $C_S$ vary between $-50$ and $+50.10^{-6}$ Nm approximately.

By varying d it is possible to vary the "mean" amplitude of $C_Y$ (in this instance approximately 2) for substantially identical ranges for $C_p$ and $C_S$.

Figure 6:
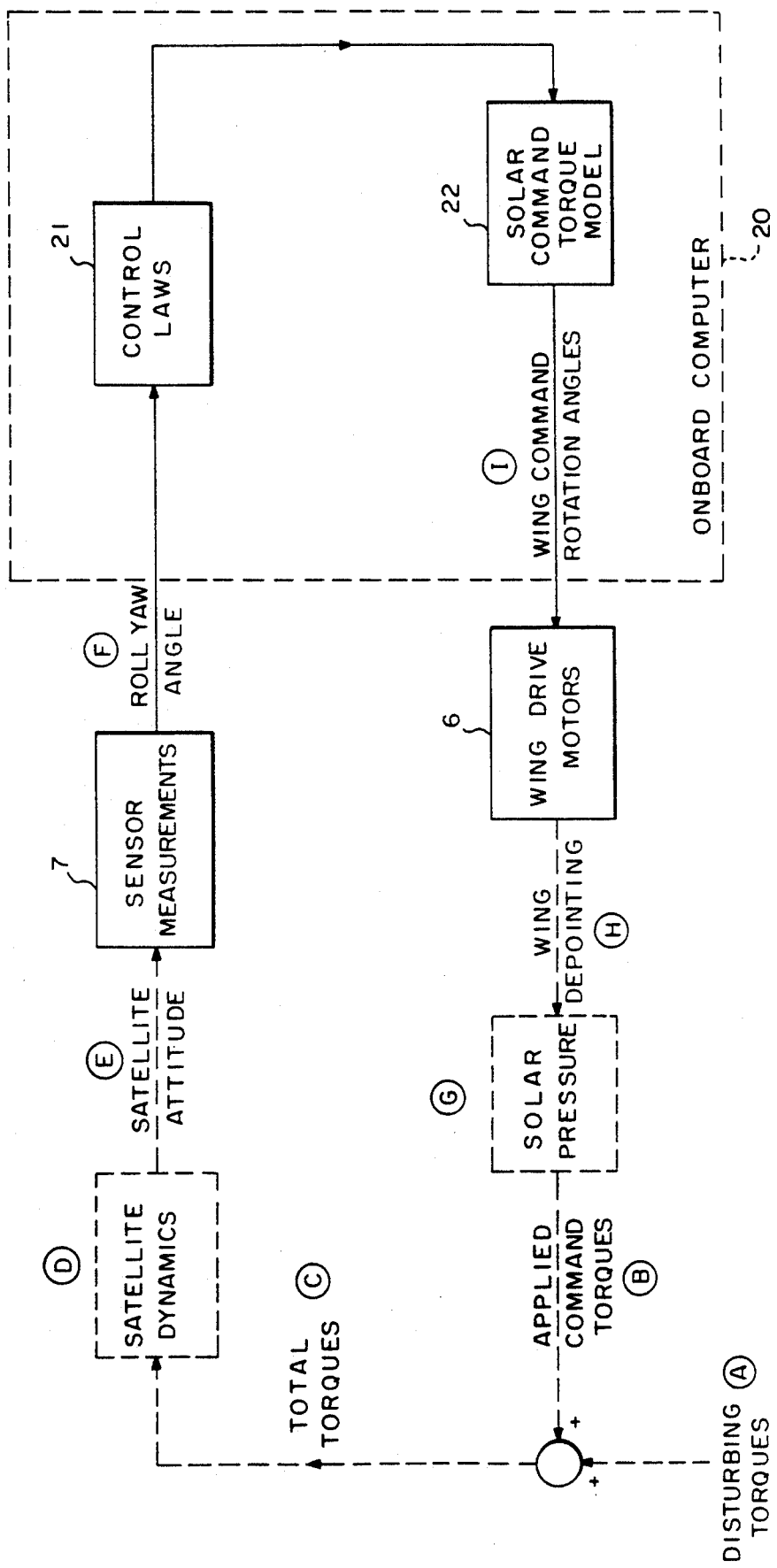
FIG. 6 is a block diagram of a roll and yaw attitude system associated with the FIG. 1 satellite.

As already mentioned, FIGS. 4, 5 and 6 relate to a EUTELSAT 2 type telecommunications satellite. The additional vanes have an angle of inclination $\alpha$ of 80° and an offset d representing 35% of the dimension L in the direction opposite to P. For a total surface area of 3.73 m², d would have the value 0.55 m and L would have the value 1.55 m.

The solar torques created in the roll-yaw plane can be used to control the attitude of the satellite by means of logic comparable with that summarized in FIG. 6.

This logic is based on the fact that, knowing the values of the roll and/or yaw angles, supplied by the terrestrial sensor 7, it is possible to determine the command torques required to adjust these angles to set point values that are predetermined or can be determined in a known way. Knowing the instantaneous inclination of the solar radiation (characterized by the S axis) in a satellite-oriented frame of reference, it is possible to deduce from the parametered surface of FIG. 4 the values of the depointing angles $\gamma_N$ and $\gamma_S$ to be applied to the wings to generate at least approximately the necessary torques as a result of the solar radiation pressure.

In FIG. 6:

the reference number 20 denotes a calculation area that is in the onboard computer or is shared between the onboard computer and a ground computer or is entirely in the latter, the reference number 21 denotes within the area 20 a unit in which are stored known laws for computing from the roll and/or yaw angle the necessary X and Z axis command torques, the reference number 22 denotes a unit in which is stored the calculation algorithm implementing the graph of FIG. 4 and which is adapted to determine the depointing angles and the resulting command instructions for the drive motors.

For more information reference may be had to French patent application No 89-15732 filed 29 Nov. 1989 with the same inventor. The control method is not in itself part of the present invention.

In FIG. 6 physical members and lines are shown in full line whereas the operative physical phenomena are shown in dashed line.

The additional vanes (or sails) 10 and 11:

must be as light as possible with the largest possible surface area, must present to the Sun a strongly absorbent and poorly reflecting surface, must be oriented so that their normal is at an angle of approximately 80° to the solar generator wing normal, must be adapted to be stowed and deployed without impeding the solar generator, must not shade the phototaic elements of the solar generator, must not be shaded by the solar generator, must have approximately the same emissivity on each side.

The vanes are similar and the remainder of the description will therefore relate primarily to the vane 10 carried at the end of the North panel 4.

Figure 7:
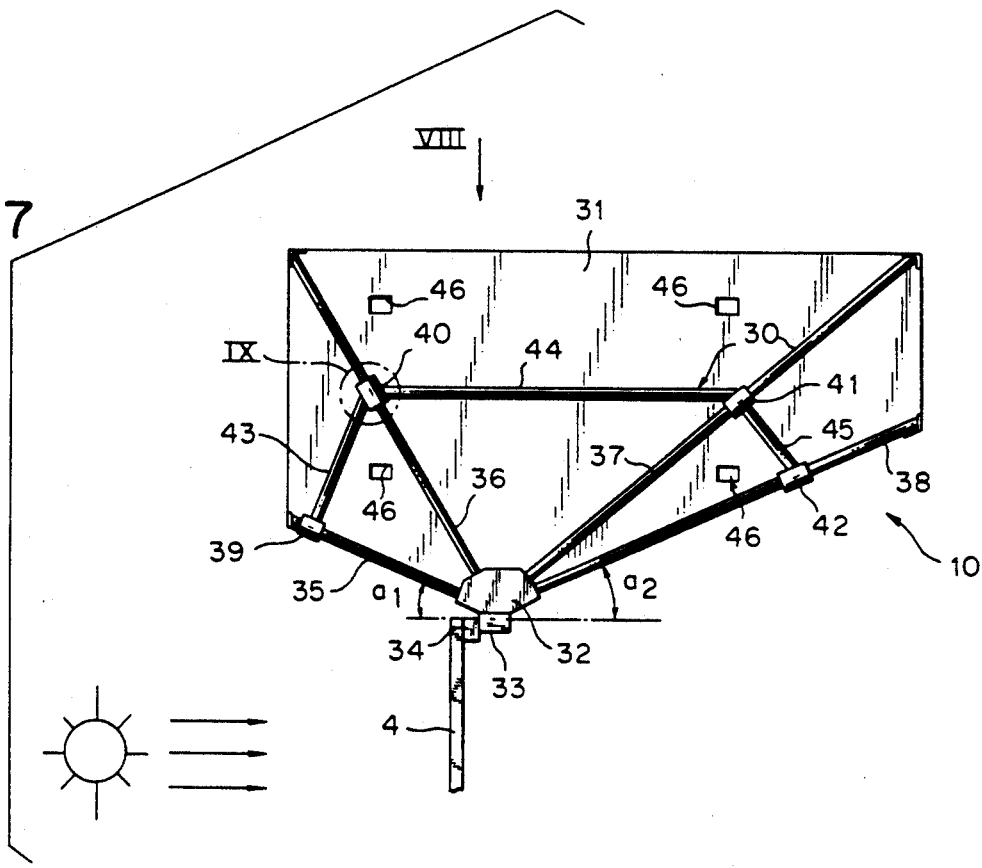
FIG. 7 is a partial view in the direction of the arrow VII in FIGS. 2 and 8 of the vane associated with the North wing of the satellite.
Figure 8:
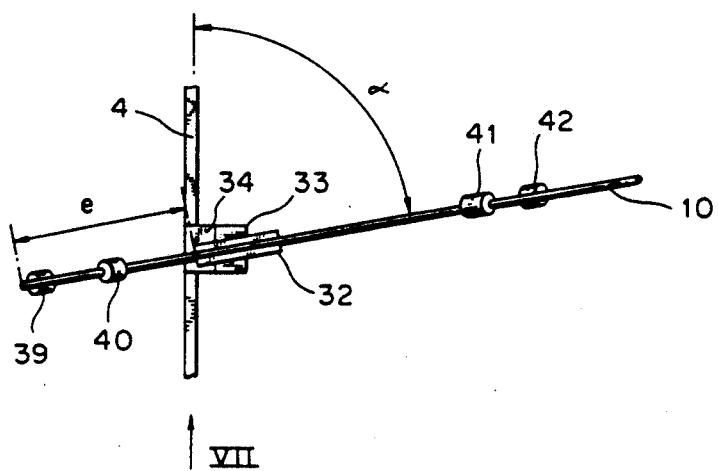
FIG. 8 is a top view of it as seen in the direction of the arrow VIII in FIGS. 2 and 7.
Figure 9:
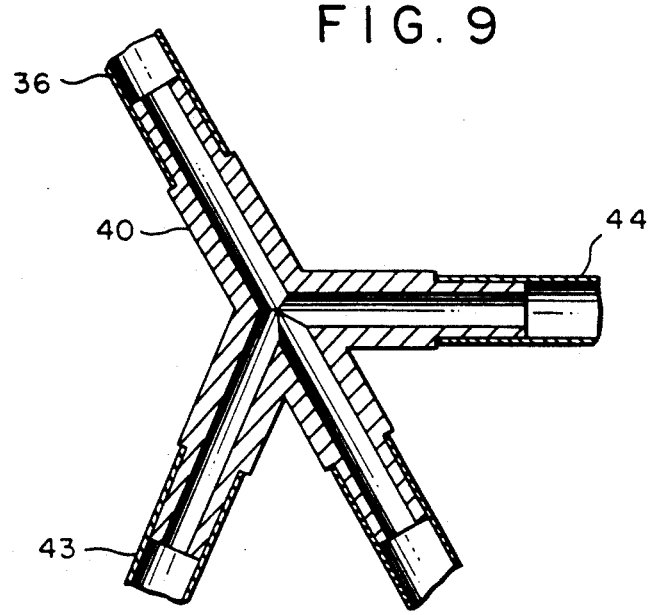
FIG. 9 is a view of the detail IX from FIG. 7 in cross-section in the plane of the vane.

Referring to FIGS. 7 through 9, the additional vane 10 includes a stiff frame 30 to which is adhesively bonded an unstretched "KAPTON" skin 31 covered with a thin black film of any appropriate known type (for example, a film of black paint). The frame includes a base insert 32 connected to the edge of the wing 4 by an articulation 33 to be described later in turn connected to an edge insert 34 joined to the frame.

The dimensions of the vane parallel and perpendicular to the Y axis are slightly less than those of the panels 4A, 4B, etc forming the wing 4 in order to remain within the profile of the latter during the launch. In practise the aforementioned dimensions are between 90% and 95% of the corresponding panel dimensions.

The shape of the vane is imposed by the frame 30, which in this example comprises four "ribs" 35, 36, 37, 38 extending towards four corners. The first rib 35 is in the form of a single tube terminating at an insert 39. The other ribs are formed by two tubes joined end to end by inserts 40, 41 and 42. The frame is stiffened by stiffener tubes 43, 44 and 45 extending between the inserts.

The vane is in the shape of a rectangle similar to the panel, with the corners nearest the panel 4A cut away, starting from the base insert 32, to avoid during solstices (maximum inclination of the Sun relative to the orbital plane):

the external solar panels shading the additional vanes, which would modify the surface area exposed to the solar radiation of one of them and generate an unwanted unbalance torque, the additional vanes shading the external solar panels, which would reduce the electrical power output of the solar generator.

For this reason the shortest rib 35, directed partly towards the Sun, is at an angle $a_1$ to the imaginary transverse edge of the aforementioned rectangle (i.e. if the latter were complete) and the rib 38 is at an angle $a_2$. These angles are substantially the same; their value is at least equal to the maximum feasible declination (23.5° for a geostationary satellite), being in practise slightly greater than this to avoid unnecessary loss of area.

As can be seen in FIG. 9, the insert 40 comprises four hollow sections inserted in the tubes forming the rib 36 and the tubes 43 and 44. The other inserts have the same general structure.

The various tubes of the frame are made from wound carbon fibers and the inserts 32, 34 and 39 through 42 are made from aluminum, for example.

Orifices 46 are formed in the skin 31: they are designed to allow passage to the stacking members adapted to hold the various panels of the wing in the stowage configuration parallel before they are deployed.

Figure 10:
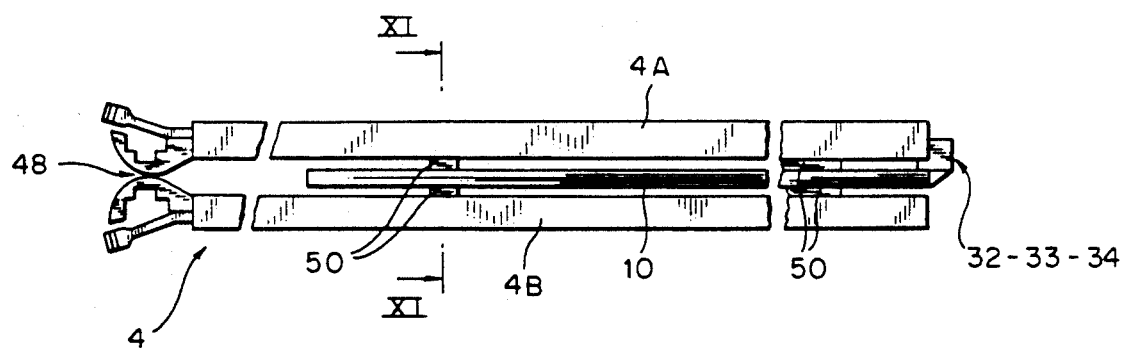
FIG. 10 is a schematic view showing the vane from FIGS. 7 and 8 in a stowed configuration between the two panels of solar wing farthest from the satellite body.
Figure 11:
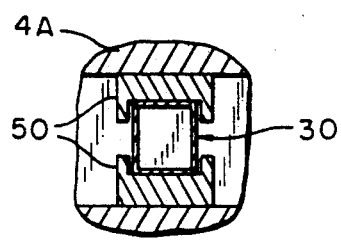
FIG. 11 is a partial view in cross-section on the line XI—XI in FIG. 10.

This stacked configuration is shown in FIGS. 10 and 11. The vane 10 is disposed between the panel section 4A which in the deployed configuration is the farthest from the satellite body and the preceding panel section 4B, to which it is hinged by any appropriate known type articulation 48. The tubular frame 30 is held in place by elastomer wedges 50 attached to the facing surfaces of the panel sections 4A and 4B. This arrangement has the following advantages:

it enables fixing of the additional vanes to the solar panels, it does not prevent the production of electrical power by the external panel when the solar generator is still in the folded configuration, it does not increase the overall size of the solar generator, the volume of which is usually limited by the nose cone of the launch vehicle.

FIGS. 12A through 12D show four successive phases in the deployment of the wing 4 and the vane 10. For purposes of simplification and given that none of the members shown retains a fixed orientation, the wing section 4A is arbitrarily shown in the same orientation in all these figures.

Figure 12A:
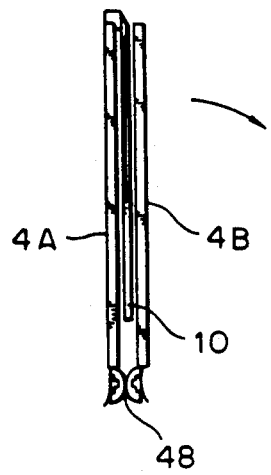
FIGS. 12A through 12D are partial schematic views of the panels and the vanes from FIG. 10 in four successive phases of their relative deployment.
Figure 12B:
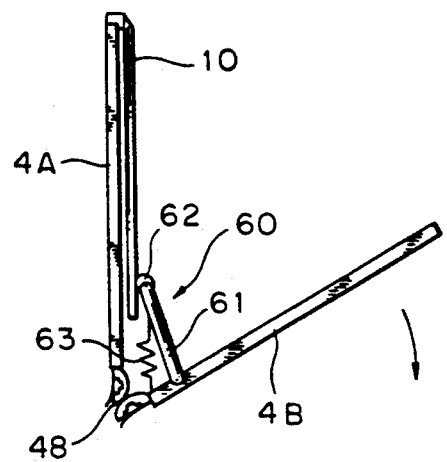
Figure 12D:
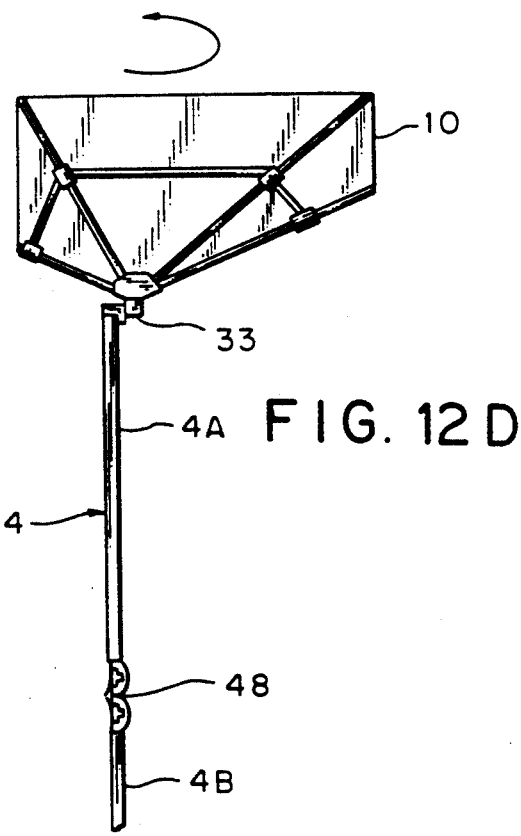
Figure 12C:
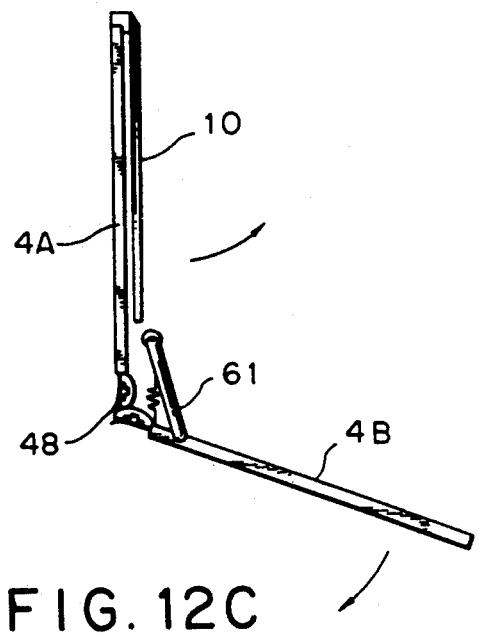

Starting from FIG. 12A (stowed configuration), the wing section 4B moves away from the wing section 4A. FIG. 12B shows a sequencing member 60 (in this example an arm 61 articulated to the wing section 4B, terminating at a roller 62 which rolls on the frame of the vane 10 and is acted on by a spring 63) which prevents deployment of the vane 10 relative to the wing section 4A (see FIG. 12C) until the angles between the wings sections 4A and 4B have become sufficiently large to prevent any collision between the vane 10 and the wing section 4A.

Figure 13A:
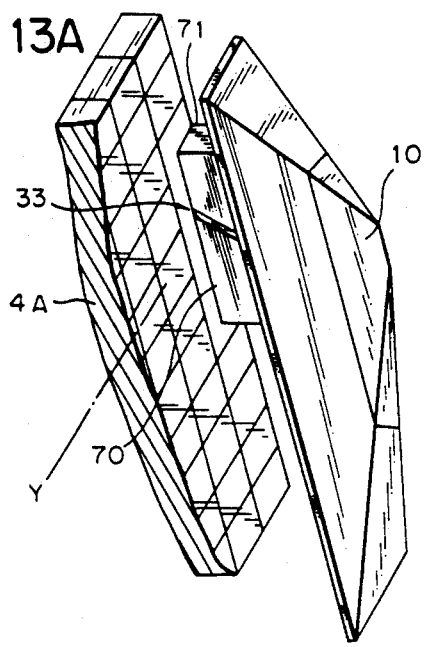
FIGS. 13A through 13C are three detail views showing the articulation joining the vanes to the last panel of the wing in three stages of deployment.
Figure 13B:
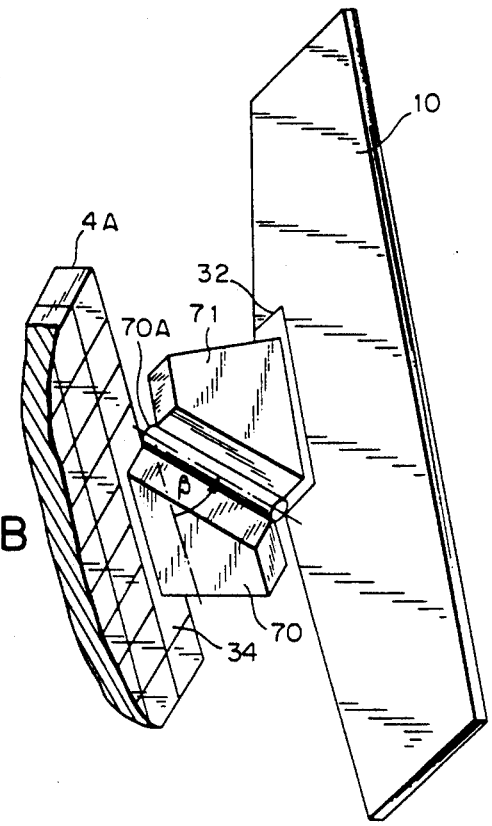
Figure 13C:
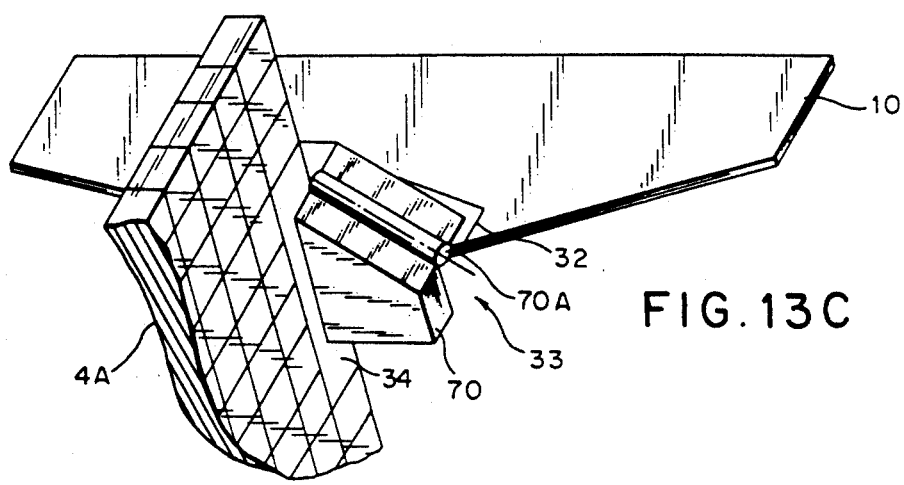

FIGS. 13A through 13C show in detail the operation of the articulation. The articulation is of the hinge type with the two trapezoidal parts 70 and 71 respectively connected to the solar wing section 4A via the insert 34 and to the additional vane 10 via the insert 32; the articulation axis 70A of the hinge is in a plane perpendicular to the axis of the solar generator wing and inclined at an angle $\beta$ relative to the latter. The articulation axis is disposed along edges bordering inclined edge surfaces of parts 70 and 71 which are face-to-face in the folded configuration and transverse surfaces which are face-to-face in the deployed configuration.

The system driving this articulation is not shown, and may be of any known type, for example a spiral spring appropriately prestressed in torsion, parallel to the axis 70A, between the parts 70 and 71 of the articulation. The drive function can also be provided by a CARPENTIER joint type flexible blade which also serves as a rotation guide and enables the hinge pin 70A to be dispensed with.

Deployment takes place in a single phase starting from FIG. 13A and ending in FIG. 13C, the orientation of the hinge pin 70A being chosen so that the required final position can be reached from the initial position without any interference between the solar wing section 4A and the additional vane 10.

FIGS. 13A through 13C show three successive deployment positions, the wing section 4A being arbitrarily shown in a fixed position.

The angle $\beta$ between the hinge pin 70A and the plane of the wing section 4A is defined according to the final inclination $\alpha$ of the vane (in this example $\beta = \alpha/2$). Variant embodiments are naturally within the competence of those skilled in the art, by taking inclined face-to-face surfaces between the half-rectangle 70 and the insert 34.

For a EUTELSAT 2 type satellite equipped with the present invention the accuracy of control about the roll (X) axis is 0.004° and the accuracy of control about the yaw (Z) axis is equal to 0.2°:

for a loss of solar generator power on the wing with the larger depointing angle of:

0.5% maximum, 0.15% average, in the presence of disturbing torques in the order of:

$5 \times 10^{-6}$ Nm in the satellite frame of reference, $6.5 \times 10^{-6}$ Nm in the solar (inertial) frame of reference, $1.5 \times 10^{-6}$ Nm relative to the secondary harmonic of the orbital period;

with a mass penalty of approximately 1 kg resulting from adding the two vanes to the ends of the solar generator wings.

On EUTELSAT 2, approximately 9 kg of propellant will be consumed for roll-yaw attitude control and 0.8 kg of propellant will be consumed for desaturation of the pitch control wheel during the seven-year life of the satellite.

Use of the present invention represents a potential saving of approximately 8.8 kg for a negligible loss of electrical power in comparison with the electrical power margins needed to allow for deterioration of the solar generator and for seasonal variations in exposure to solar radiation (solstices and eclipses during equinoxes).

It goes without saying that the foregoing description has been given by way of non-limiting example only and that numerous variations may be put forward by those skilled in the art without departing from the scope of the invention. For example, the vanes 10 and 11 could be replaced with several smaller vanes, offset transversely to the pitch axis, or parallel to this axis (with an accordeon type assembly similar to that of the wing itself) and also having the same surface area. As the requirement in practise is to use additional surfaces with as large a surface area as possible, it is advantageous to use several vanes of a size only slightly smaller than the solar panels between which they are folded in the stowed configuration. As described, the vanes join to the end solar panel are cut away at two corners (at an angle of 23.5° in the case of a geostationary satellite, plus the maximum value of the inclination of the orbit allowed); however, the cutaways may be eliminated (except for the first) in the case of a succession of vanes articulated in alignment with the wing.

There is claimed:

1. Attitude control device for a satellite stabilized on three axes including a pitch axis, the device comprising two solar generator wings extending in opposite directions away from a satellite body on opposite respective wing longitudinal axes at least approximately parallel to the pitch axis, two drive motors adapted to drive said wings independently of each other in rotation about respective rotation axes at least approximately parallel to the pitch axis to keep said wings facing the Sun with a depointing angle at most equal to a predetermined maximum wing depointing value, a set of sensors adapted to measure attitude angles and a computation system adapted to command the drive motors according to the attitude angles, which device further comprises on each wing an additional surface in the form at least one vane extending longitudinally beyond a free end of said each wing, parallel to said respective wing longitudinal axis of said each wing, said additional surfaces having substantially a same surface area and being inclined about said respective wing longitudinal axes of said wings relative to said wings in opposite directions at approximately a same angle α less than the 90° complement of said maximum wing depointing value.

2. Device according to claim 1 wherein said angle α is substantially equal, to within 5°, to said 90° complement of said maximum wing depointing value.

3. Device according to claim 2 wherein said maximum wing depointing value has a value of approximately 10° and said amplitude of inclination of the vanes is approximately 80°.

4. Device according to claim 1 wherein said additional surface associated with at least one wing is in the form of a single vane.

5. Device according to claim 1 wherein said additional surfaces are offset overall to the same side of said pitch axis if the wings are coplanar.

6. Device according to claim 5 wherein each additional surface is in the form of a single vane and said vanes are offset relative to said pitch axis by approximately equal distances.

7. Device according to claim 6 wherein said offset distance is between 5% and 45% of the width of said wing.

8. Device according to claim 1 wherein each additional surface comprises at least one vane in the shape of a rectangle whose respective front and rear corners near the wing to which it is fixed are cut away starting from the area fixed to the wing and at approximately equal angles measured relative to an imaginary edge of said vane transverse to said longitudinal axis of the wing carrying said vane.

9. Device according to claim 8 wherein said front and rear corners are cut away at an angle between 23° and 30°.

10. Device according to claim 1 wherein each vane comprises a frame to which is adhesively bonded an unstretched skin adapted to absorb solar radiation.

11. Device according to claim 1 wherein each additional surface is folded up with the respective solar generator wing in a stowed configuration of said wing.

* * * * *

UNITED STATES PATENT AND TRADEMARK OFFICE
CERTIFICATE OF CORRECTION

PATENT NO. : 5,133,518
DATED : July 28, 1992
INVENTOR(S) : Patrick FLAMENT It is certified that error appears in the above-identified patent and that said Letters Patent is hereby corrected as shown below:

On title page, item

[73] Assignee:  Delete "Societe Nationale Industrielle et Aerospatiale,", insert therefor --Aerospatiale Societe Nationale Industrielle --

Signed and Sealed this

Fourteenth Day of September, 1993

*Attest:*

BRUCE LEHMAN

*Attesting Officer*  *Commissioner of Patents and Trademarks*